March 30, 1937.        J. I. COCHRAN ET AL        2,075,177
FLUID METER
Filed March 20, 1934        3 Sheets-Sheet 1
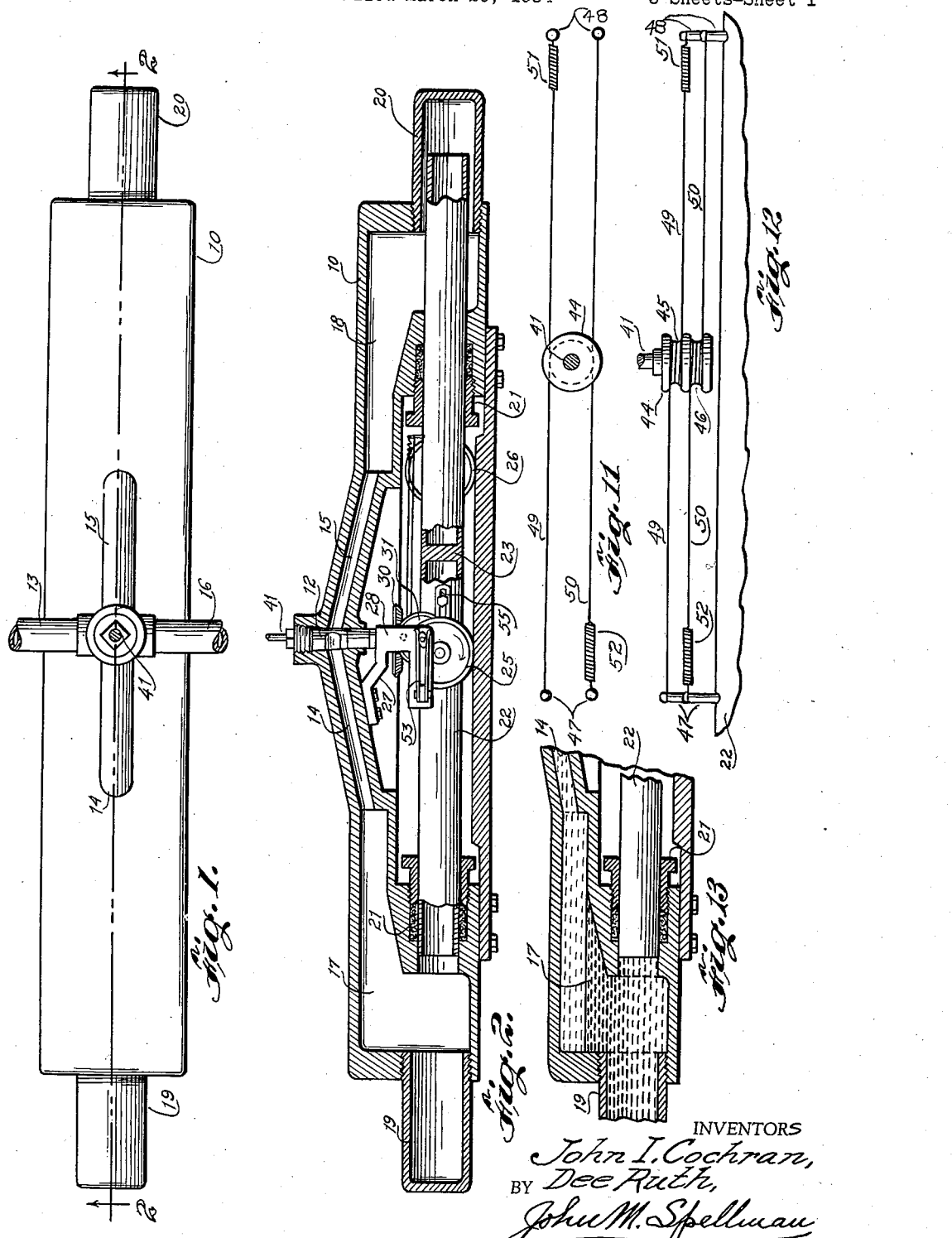
INVENTORS
John I. Cochran,
BY Dee Ruth,
John M. Spellman
ATTORNEY.

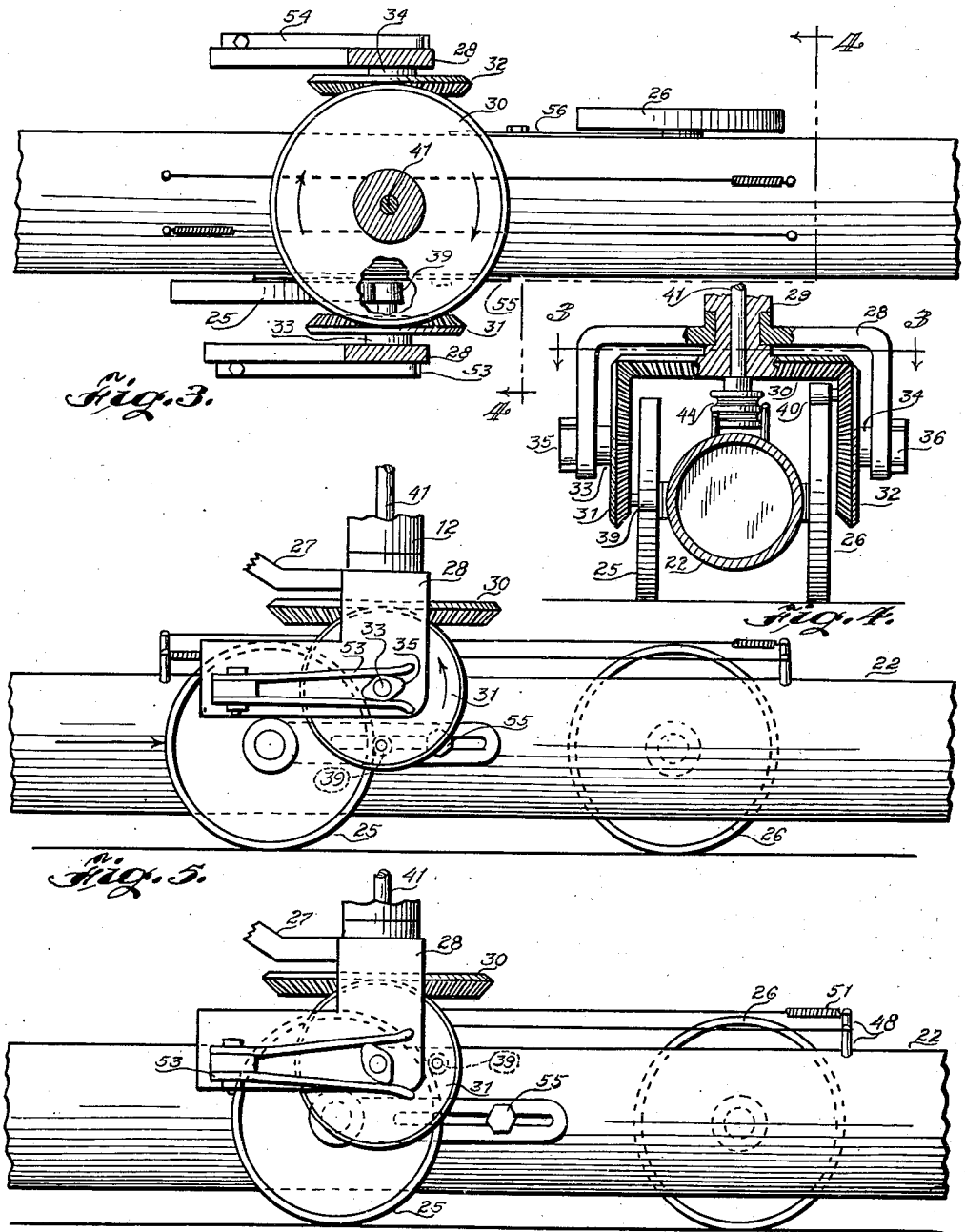

March 30, 1937.    J. I. COCHRAN ET AL    2,075,177
FLUID METER
Filed March 20, 1934    3 Sheets-Sheet 3
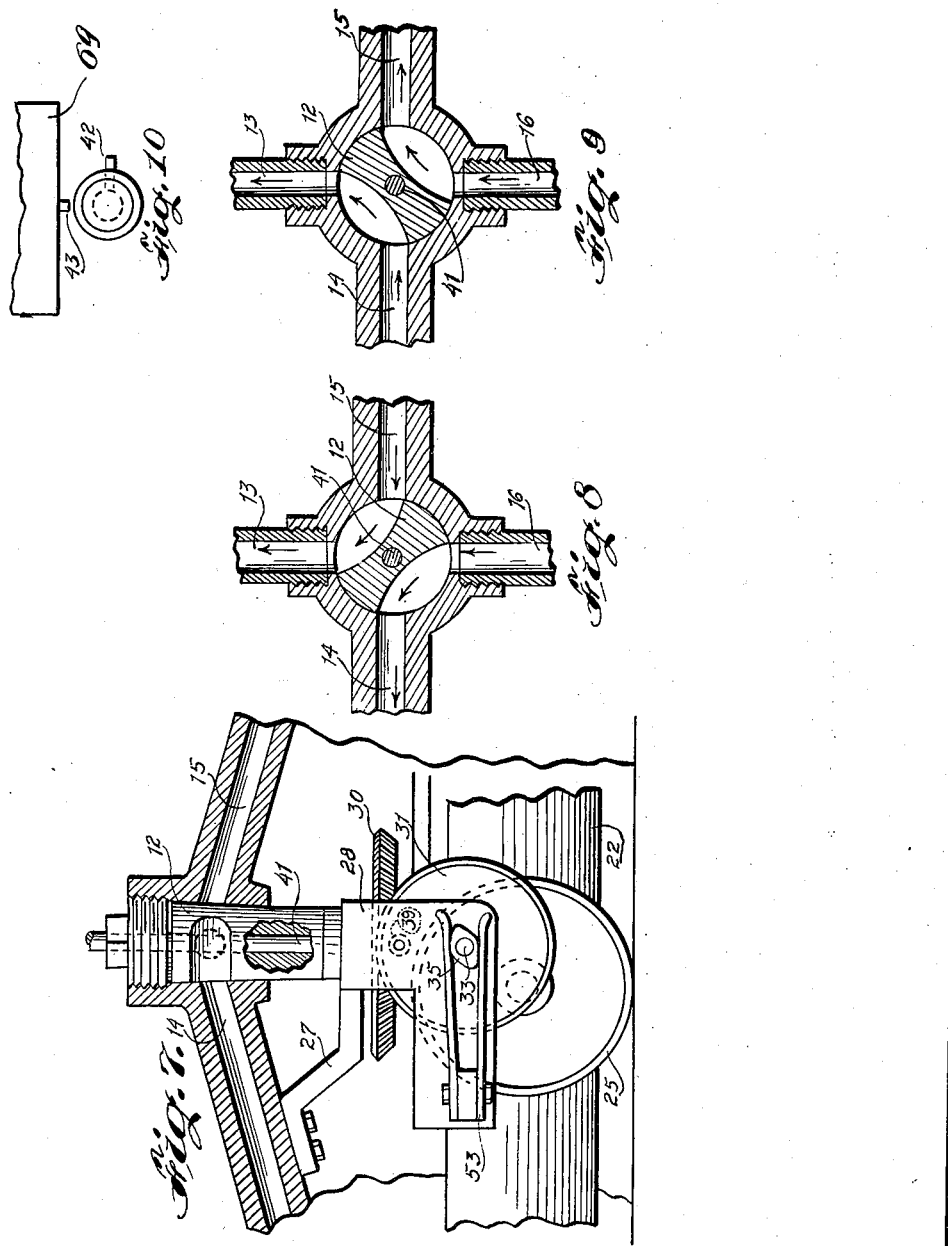
INVENTORS
John I. Cochran,
BY Dee Ruth,
John M. Spellman
ATTORNEY.

Patented Mar. 30, 1937

2,075,177

UNITED STATES PATENT OFFICE 2,075,177

FLUID METER

John Irion Cochran and Dee Ruth, Gladewater, Tex.; Maggie Ruth administratrix of said Dee Ruth, deceased Application March 20, 1934, Serial No. 716,527

3 Claims. (Cl. 73—251)

This invention relates to meters and more particularly to meters for registering the amount of flow of fluids and consists in the combinations, constructions and arrangements herein described and claimed.

It is an object of the invention to provide a novel valve construction especially designed for the particular construction of meter herein disclosed.

An object is to provide in a device of this kind a novel means for operating said valves.

Other objects and advantages will appear in the following specification, forming part of this application and the novel features of the device will be particularly pointed out in the appended claims.

The invention is illustrated in the accompanying drawings, forming part of this application, in which—

Figure 1 is a top plan view of a meter embodying a practical adaptation of the novel features of my invention, Figure 2 is a longitudinal sectional view taken substantially along line 2—2 of Figure 1.

Figure 3 is an enlarged detail view taken along line of section 3—3 of Figure 4, Figure 4 is an enlarged detail view taken along line of section 4—4 of Figure 4, Figure 5 is a side elevational view of that portion of the device shown in Figure 3, Figure 6 is a view similar to Figure 5, but with certain parts advanced.

Figure 7 is a fragmentary elevational view similar to Figure 6, and partly in section, disclosing the valve structure hereinafter to be more fully referred to, Figures 8 and 9 are fragmentary sectional views showing positions which the valve utilized in the device may assume, Figure 10 is a detail view of a mechanism herein utilized, Figures 11 and 12 are plan and elevational views, respectively, of a mechanism herein utilized and Figure 13 is a sectional view of one end portion of the device.

Referring more particularly to the drawings, there is shown therein a meter comprising an elongated substantially horizontal casing 10 having mounted centrally in the upper portion thereof a rotary valve 12 which selectively interconnects a pipe 13 with one of a pair of downwardly extending passages 14 and 15 provided in the casing 10 while connecting the other with a pipe 16. The passages 14 and 15 lead to the upper portions of chambers 17 and 18, respectively, formed at opposite ends of the casing 10 wherein the liquid to be measured is circulated, and extending outwardly from the chambers 17 and 18 are tubular hollow closures or plugs 19 and 20, respectively.

Reciprocably mounted between the chambers 17 and 18 adjacent the lower ends thereof and provided with suitable packings 21 is a hollow cylindrical member 22 constituting a piston which is centrally divided by a transverse wall as indicated at 23 in Figure 2.

It will be seen that the piston 22 is of such length that at either extremity of its movement, one of its open ends will be within the adjacent hollow closure or plug 19 or 20, as the case may be.

The piston member 22 is provided with a pair of wheels 25 and 26 mounted one in a different transverse position from the other but in parallel relationship to each other at opposite sides of the piston 22 and also at opposite sides of the transverse central wall 23.

Secured to the under side of the casing portion where the passage 14 is located, is a frame 27 which carries a depending yoke 28 through which the lower portion of the valve 12 protrudes as indicated at 29 (see Figure 4) and terminates in a bevel gear 30 which is shown conventionally as integral with the portion 29, but, obviously, for convenience in assembly, said gear 30 may be made separately and attached in any approved manner to the portion 29. Said gear 30 is in mesh with a pair of miter gears 31 and 32 which are mounted at the inner sides of the lower end portions of the yoke 28 upon axles 33 and 34 which are journalled in said end portions of the yoke and terminate in cams 35 and 36 at the outer sides of the yoke 28.

The miter gears 31 and 32 carry lugs 39 and 40, respectively, inwardly adjacent their peripheries and positioned to coact with the wheels 25 and 26, respectively.

Extending axially through the entire length of the valve 12 is a revoluble shaft 41 which is provided at its upper end with a laterally extending lug 42 adapted to co-operate with a counting mechanism 69, hereinafter referred to as the true reading indicator, and actuated by a detent 43. The lower end of the shaft 41 terminates in a spool 44 having a pair of grooves 45 and 46 and which is positioned immediately below the gear 30.

A pair of uprights posts 47 and 48 is affixed at either end of the piston 22, the posts of each pair being of different heights corresponding, respectively, to the planes of the spool grooves 45, 46, and one of each pair has attached to it a cable 49 or 50, respectively, the cable 49 having several turns wound in the groove 45 and the cable 50 having several turns wound oppositely in the groove 46, the cable 49 terminating in a spring 51 at one post while the cable 50 terminates likewise in a spring 52.

The yoke 28 is provided with horizontally extending pairs of flat spring members 53 and 54 which are positioned to coact with the cams 35 and 36, respectively. Means for horizontally adjusting the position of the wheels 25 and 26 with respect to the piston 22 is shown at 55 and 56, respectively.

Operating fluid entering the inlet pipe 16, when the valve 12 is in the position indicated in Figure 8, will flow through passage 14 to the chamber 17, causing the piston 22 to fill and move to the right to its position as indicated in Figure 2. While this is happening fluid in the chamber 18 is being forced through the passage 15 and thence outwardly through the outlet pipe 13. This movement of the piston is thereupon reversed by means of the turning of the valve 12 through a cycle of 90° to a position as shown in Figure 9.

The operation of the valve is as follows: When the piston 22 moves to right from its position indicated in Figure 5 to that shown in Figure 6, the wheel 25 comes into contact with the lug 39 which rides upon its periphery and causes a one quarter turn of the miter gear 31 and a corresponding quarter turn of the cam 35 which latter thereupon, because of its peculiar shape and the snap action of the springs 53 causes an additional quarter turn of the gear 31. This action also occurs on the opposite side by corresponding members when the movement of the piston 22 is reversed, as will be obvious. The ratio of gears 30 and 31, 32, is 2 to 1. Therefore for each one-half turn of miter gear 31 or 32, as described, bevel gear 30 and valve 12 rotate one-fourth turn simultaneously.

To keep the shaft 41 rotating in the same direction, the hereinbefore described cables 49 and 50 have been provided. It will be seen that when the piston moves to the left of its position shown in Figures 11 and 12, the cable 49 will cause a counterclockwise movement of the spool 42, as it is taut in the direction of pull, while the cable 50 has its normally distended spring 52 tending always to retract and thereby exerting a tension on said cable 50 in the direction of pull of the other cable 49, thereby automatically taking up the slack which would otherwise occur in the cable 50 between the spool 44 and the post 48 to which said cable 50 is attached, the loosening of the portion of said cable 50 about the spool during this movement of the piston 22 permitting said spring 52 to pull the cable taut between the spool 44 and the post 47 to which said spring is attached. Likewise a movement of the piston in the opposite direction continues this counter-clockwise movement for the same reasons. The direction of rotation of this shaft is optional; it may be clockwise, depending on requirements relating to the functioning of the indicator operating element 43. As drawn, however, it is counter-clockwise.

The wheels 25 and 26, hereinbefore described, for operating the miter gears 31 and 32, respectively, travel in rolling contact upon bearing surfaces provided therefor on the casing 10 and, in effect, they support the weight of the piston 22, although said piston has its oposite end portions slidable through the packing glands 21. That is to say, while some of the weight, of course, is upon said packings, the weight is mainly upon said wheels 25, 26, whereby frictional resistance in said packings is relieved to a considerable degree and at the same time a more positive rotation of the wheels is assured for the operation of said miter gears 31, 32.

Preferably, as shown, the lugs 39, 40, comprise studs which are obviously secured tightly in apertures provided therefor in the miter gears 31, 32, and have antifriction sleeves or roller members thereon to engage the peripheral portions of said wheels 25, 26. It may also be here noted that said lugs 39, 40, are disposed one hundred eighty degrees apart, or, in other words, in diametrically opposite positions relative to the axis of said miter gears 31, 32 at the ends of the piston strokes.

In operation, normally, or when the piston 22 is at either end of its stroke, one of said lugs 39 or 40 is below the axis of the miter gears 31, 32, and in the horizontal plane of the axes of the wheels 25, 26, and, for example, as shown in Figures 3, 4 and 5 of the drawings, wherein the lug 39 is just in engagement with the peripheral portion of the wheel 25, the initial travel of said wheel 25 in engagement with said lug 39, as illustrated in Figure 6, causes the miter gear 31 to rotate counterclockwise, as indicated by the arrow in Figure 5 and to the position shown in Figure 6. A continued travel of the wheel 25 in the same direction brings the lug 39 to a position diametrically above its normal position shown in Figure 5, the movement of the miter gear 31 by the rolling contact of the wheel 25 against the antifriction sleeve or roller of the lug 39 being assisted by the opposed springs 53 pressing on the cam element 35 which causes a snap action and quick movement of the valve 12 during the latter part of its rotative movement, thereby overcoming any possibility of the piston 22 hesitating appreciably at the termination of each stroke or lagging during the initial part of the return stroke, as the liquid supply is instantly admitted to the chamber 17 or 18.

The device of the present invention is designed more particularly for measuring g a s-l a d e n fluids or liquids having a different density or specific gravity, especially such as crude oil as it comes from the well or source of supply. Such oil contains gas as well as other components and in determining the content in figuring royalty payments and for other reasons, it is customary to run the oil through some kind of meter or measuring device or apparatus. The present invention is brought about to assure a more positive action and accurate measurement of the components and volume of the fluid or liquid passing through the meter and at the same time to simplify the structure and minimize the cost of manufacture and maintenance of the device or apparatus in operation.

In operation of the meter of the present invention a body of displacement fluid or liquid is maintained in the chambers 17, 18, serving in effect as a seal and displaceable liquid piston heads between the end portions of the reciprocatory piston 22 and the passages 14, 15, through which latter the fluid or liquid to be measured enters and leaves said chambers 17, 18, in measured quantity. The kind of fluid or liquid maintained in the chambers 17, 18, depends upon the characteristic components of the fluid or liquid to be measured. When oil or the like is measured the liquid may be water or of such character that it will remain separate from the liquid being measured. Two liquids are indicated in Figure 13 of the drawings, that maintained in the chamber 17 as a liquid piston head being shown in the lower portion of the chamber by the heavier broken lines, and the liquid being measured shown in the upper portion and indicated by the lighter lines.

While but one form of the device has been shown in this application it is obvious that various modifications may be made without departing from the spirit of the invention within the scope of the appended claims.

What is claimed is:

1. A fluid meter having a pair of opposed measuring chambers, an inlet and an outlet pipe, a valve positioned between and controlling communication of both of said pipes with said measuring chambers, downwardly extending passages from the valve connecting with said pair of measuring chambers, a reciprocatory piston slidably mounted between and extending at its end portions into the chambers, gears for rotating the valve, said gears having lugs on the side faces thereof, a pair of wheels attached to the piston and adapted to alternately engage one of said lugs to move the gears, a pair of cams fixed to rotate with said gears, spring means acting upon said cams for imparting additional movement to the gears in the direction of rotation imparted by said wheels, a shaft connected to a registering device, and means connected to said shaft and the piston for imparting movement in one direction only to the shaft when said piston is reciprocated.

2. A fluid or liquid meter comprising a casing having a pair of opposed measuring chambers therein, an inlet and an outlet, a valve between the inlet and the outlet, a pair of opposed passages leading respectively from said valve to said measuring chambers, said valve moving intermittently in one direction and alternately establishing communication between said inlet and either of said measuring chambers and at the same time establishing communication between said outlet and the other measuring chamber, a reciprocatory piston operating between said measuring chambers with its end portions projected into either chamber on each of its strokes, said piston adapted to displace a proportionate amount of the fluid or liquid content of each chamber whereby a working head of fluid or liquid is maintained within each of said chambers, and means operably connected with said valve and said piston whereby, upon reciprocation of the piston, the valve is moved intermittently in one direction, the means for operating the valve comprising a rotatable stem for the valve, a bevelled gear on said stem, a pair of miter gears oppositely disposed and meshing with said bevelled gear, said miter gears having on their opposed inner faces lugs, said lugs being disposed the one on one of said miter gears in diametrically opposed relation to the lug on the other miter gear at the ends of the piston strokes, a pair of wheels rotatable upon the reciprocation of the piston, said wheels being mounted on the piston respectively on opposite sides thereof, the one wheel being in a different transverse position from the other wheel, whereby upon one stroke of the piston one of the wheels engages the lug on one of said miter gears and rotates the gear in one direction and upon the reverse stroke of the piston the other wheel engages the lug on the other miter gear and rotates it in the opposite direction, thereby rotating said bevelled gear intermittently in one direction.

3. A fluid or liquid meter comprising a casing having a pair of opposed measuring chambers therein, an inlet and an outlet, a valve between the inlet and the outlet, a pair of opposed passages leading respectively from said valve to said measuring chambers, said valve moving intermittently in one direction and alternately establishing communication between said inlet and either of said measuring chambers and at the same time establishing communication between said outlet and the other measuring chamber, a reciprocatory piston operating between said measuring chambers with its end portions projected into either chamber on each of its strokes, said piston adapted to displace a proportionate amount of the fluid or liquid content of each chamber whereby a working head of fluid or liquid is maintained within each of said chambers, and means operably connected with said valve and said piston whereby, upon reciprocation of the piston, the valve is rotated intermittently in one direction, the means for operating the valve comprising a gear rotatable in fixed driving relation to the valve, a pair of opposed gears meshing with said first mentioned gear at opposite sides of the axis thereof, said pair of gears having lugs on their inner opposed faces, the lug on the one gear being diametrically opposite to the lug on the other gear at the ends of the piston strokes with respect to the axis of said pair of gears, and a pair of wheels mounted on said piston on opposite sides thereof, the one wheel being in a different transverse position from the other wheel but said wheels being arranged to travel in parallel paths, the one wheel, upon movement of said piston in one direction, engaging the lug on one of said pair of opposed gears whereby to rotate the latter in one direction and the other wheel engaging the lug on the other of said pair of gears whereby to rotate it in the opposite direction, thereby rotating said first mentioned gear in one direction upon each stroke of the piston and correspondingly rotating said valve, an indicator, a shaft rotatably and axially disposed through said valve, extending above and below the same, said indicator having an actuator element and said shaft having an element intermittently engaging said actuator element upon rotation of the shaft, and means for intermittently rotating said shaft in one direction, said means comprising a spool fixed on the shaft, and a pair of cables, the one wound about said spool in an opposite direction from the other, one end of each cable being attached to a post on said piston and the opposite end of each cable being attached by a spring element to a post in an opposed position longitudinally on said piston whereby, upon reciprocation of the piston, said shaft is intermittently rotated in one direction.

JOHN IRION COCHRAN.
DEE RUTH.